United States Patent
Osamura et al.

(10) Patent No.: US 9,311,757 B2
(45) Date of Patent: Apr. 12, 2016

(54) MOVEMENT DISTANCE ESTIMATING DEVICE AND MOVEMENT DISTANCE ESTIMATING METHOD

(71) Applicant: FUJITSU LIMITED, Kawasaki-shi, Kanagawa (JP)

(72) Inventors: Kazuki Osamura, Kawasaki (JP); Asako Kitaura, Kawasaki (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 14/186,491

(22) Filed: Feb. 21, 2014

(65) Prior Publication Data

US 2014/0294246 A1   Oct. 2, 2014

(30) Foreign Application Priority Data

Mar. 28, 2013   (JP) ................. 2013-070278

(51) Int. Cl.
*G06K 9/00* (2006.01)
*G07C 5/00* (2006.01)
*G06T 7/20* (2006.01)

(52) U.S. Cl.
CPC .............. *G07C 5/00* (2013.01); *G06K 9/00798* (2013.01); *G06T 7/204* (2013.01); *G06K 9/00208* (2013.01); *G06T 2207/30236* (2013.01)

(58) Field of Classification Search
USPC ......................................................... 382/107
See application file for complete search history.

(56) References Cited

U.S. PATENT DOCUMENTS

2009/0041337 A1*  2/2009  Nakano .............. G06K 9/00798
                                                                382/154
2009/0189783 A1*  7/2009  Koitabashi .............. G01S 11/12
                                                                340/937

FOREIGN PATENT DOCUMENTS

| JP | 10-283462 | 10/1998 |
| JP | 2002-236912 | 8/2002 |
| JP | 2002-352226 | 12/2002 |
| JP | 2006-337075 | 12/2006 |
| JP | 2006-349607 | 12/2006 |

OTHER PUBLICATIONS

Okatani Takayuki, "Bundle Adjustment", IPSJ SIG Technical Report, 2009 (16 pages (Translation of p. 1, left column, line 20 to p. 16, left column line 10).

(Continued)

*Primary Examiner* — Yon Couso
(74) *Attorney, Agent, or Firm* — Staas & Halsey LLP

(57) ABSTRACT

A movement distance estimating device includes: a memory; and a processor coupled to the memory and configured to: determine, based on a first image and a second image included in images captured by an image capture device mounted on a moving body, an amount of relative movement of the moving body between a first time point at which the first image is captured and a second time point at which the second image is captured, determine a scale for the amount of relative movement, based on a relation in a three-dimensional space between a road surface and a spatial point corresponding to a feature point in an area other than a road-surface area in at least one image of the captured images, and determine a movement distance of the moving body between the first and second time points, based on the amount of relative movement and the scale.

15 Claims, 20 Drawing Sheets

(56) References Cited

OTHER PUBLICATIONS

Kawanishi Ryosuke et al, "Construction of 3D Environment Model by Using Omni-Directional Camera-Estimation of Camera Motion with a Feature Flow Model" MIRU2009, Jul. 2009,(7 pages) (Translation of 1st page, left column, line 28 to 7th page, right column line 4).

* cited by examiner

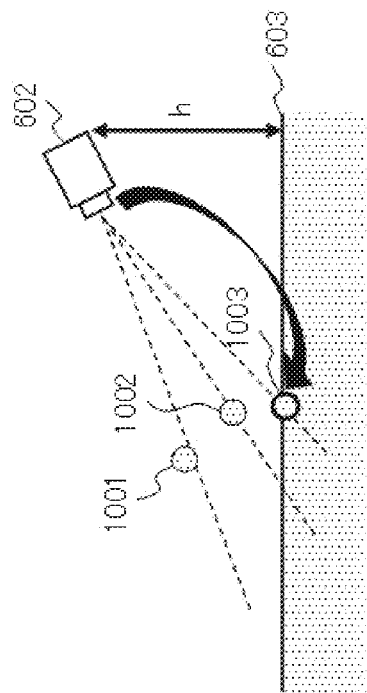
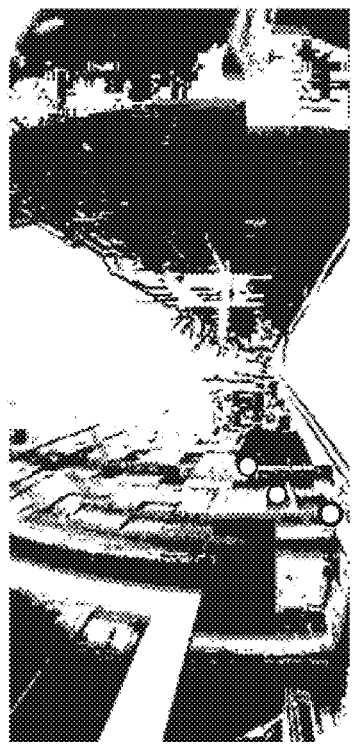
FIG. 10

FIG. 11
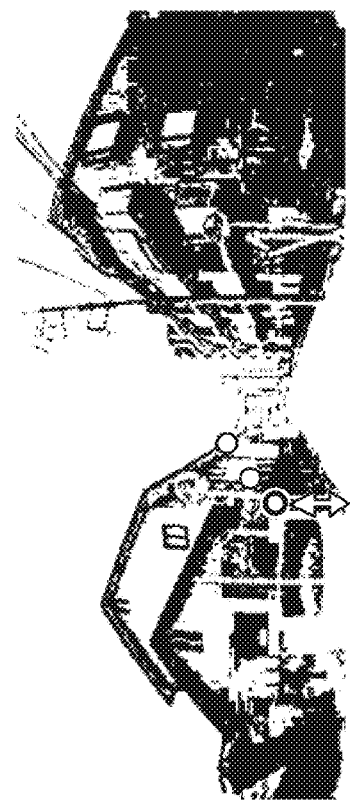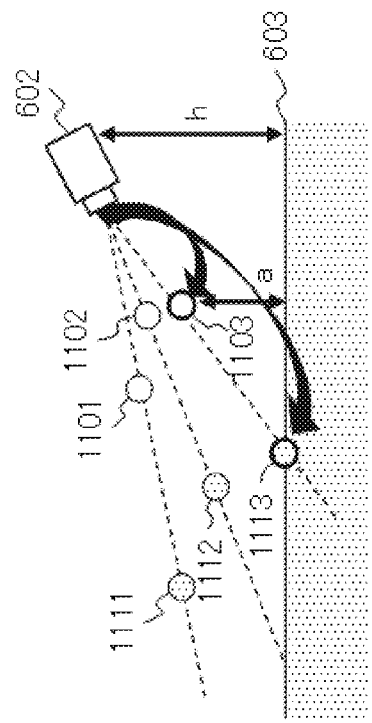

MOVEMENT DISTANCE ESTIMATING DEVICE AND MOVEMENT DISTANCE ESTIMATING METHOD

CROSS-REFERENCE TO RELATED APPLICATION

This application is based upon and claims the benefit of priority of the prior Japanese Patent Application No. 2013-070278, filed on Mar. 28, 2013, the entire contents of which are incorporated herein by reference.

FIELD

The present embodiment is related to a movement distance estimating device and a movement distance estimating method.

BACKGROUND

In recent years, there has been an increasing number of cases in which drive recorders that are mounted on vehicles in order to perform forensics recording and so on are utilized and recorded video and vehicle-behavior data are utilized to perform driving-hazard analyses and situation visualization. In driving-hazard analyses, in order to identify dangerous scenes and analyze situations, it is desirable to perform a detailed analysis of dangerous vehicle behavior, such as abrupt deceleration, by using high-accuracy vehicle-speed information.

As a recent trend, simplified drive recorders that record vehicle speeds obtained from the global positioning system (GPS), instead of high-accuracy vehicle speeds based on vehicle-speed pulses, are increasing in number because of their ease of installation that does not involve work for connecting wires to vehicles. Vehicle speeds obtained from the GPS are sufficiently accurate for the purpose of recording, but are not sufficiently accurate for the purpose of analyses. The lack in accuracy has been a bottleneck when vehicle speeds are used for analyses. Accordingly, it is desired to estimate vehicle speeds by using a method other than the methods using vehicle-speed pulses and the GPS.

One available method for estimating a movement distance and a movement speed of a vehicle based on video acquired by a vehicle-mounted camera is a method for performing estimation based on feature-point tracking. In this estimation method, a monocular camera mounted on a moving vehicle captures video to time-sequentially track groups of feature points detected from images at individual time points. A translation and a rotation that indicate a geometric positional relationship between the images which satisfies a correspondence relationship of the groups of feature points between the images are estimated as motion parameters, and a movement distance and a movement speed are estimated based on the magnitude of the translation.

For example, there is a distance measuring device that measures a distance to an object that is located outside a moving body traveling on a road surface (see, for example, Japanese Laid-open Patent Publication No. 2006-349607).

The distance measuring device tentatively determines spatial coordinates of a fixed point in a three-dimensional space by using an arbitrary scale, based on feature points in images captured at different time points by monocular image capturing means. Based on the spatial coordinates of the fixed point located on the road surface, the distance measuring device determine a plane equation for an approximate plane representing the road surface that is being traveled, and determines a height from an approximate plane of the viewpoint of the camera in the coordinate system of the spatial coordinates, based on the determined plane equation. Based on the height from the approximate plane from the viewpoint of camera and the mounting height of the image capturing means from the road surface, the distance measuring device determines a scale of the spatial coordinates and modifies the spatial coordinates of the fixed point based on the determined scale.

There is also a three-dimensional-information restoration device that determines a correction coefficient based on distance information of a photographic target, the distance information resulting from measurement performed by a distance sensor, and thereby converts distance information determined from images of the photographic target into an absolute quantity (see, for example, Japanese Laid-open Patent Publication No. 2006-337075).

There is also a separator-line recognition device that recognizes divider lines, such as white line, drawn on a road (for example, Japanese Laid-open Patent Publication No. 2002-236912).

There is also a traveling-road detecting device that detects lane markers at both sides of a driving lane from an image of a traveling road behind a vehicle and that determines traveling-road-model parameters including horizontal displacement of the vehicle based on position information regarding the lane markers (see, for example, Japanese Laid-open Patent Publication No. 2002-352226).

A three-dimensional environment generation method using a feature point flow model is also available (see, for example, Kawanishi Ryosuke, Yamasita Atsushi, and Kaneko Toru, "Construction of 3D Environment Model by Using Omni-Directional Camera—Estimation of Camera Motion with a Feature Flow Model-", MIRU2009, July, 2009). In the three-dimensional environment generation method, through utilization of the fact that the same feature points are measured between adjacent observation points when measurement results of different measurement points are combined, the scales are made to match each other so as to minimize the sum of squares of an error in the three-dimensional coordinates.

Bundle adjustment for numerically executing, in a problem for estimating parameters of a geometric model from images, nonlinear optimization with the aim of achieving high estimation accuracy has been available (see, for example, Okatani Takayuki, "Bundle Adjustment", *IPSJ SIG Technical Report*, 2009).

SUMMARY

According to an aspect of the invention, a movement distance estimating device includes: a memory; and a processor coupled to the memory and configured to: determine, based on a first image and a second image included in images captured by an image capture device mounted on a moving body, an amount of relative movement of the moving body between a first time point at which the first image is captured and a second time point at which the second image is captured, determine a scale for the amount of relative movement, based on a relation in a three-dimensional space between a road surface and a spatial point corresponding to a feature point in an area other than a road-surface area in at least one image of the captured images, and determine a movement distance of the moving body between the first time point and the second time point, based on the amount of relative movement and the scale.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an image in which a reference spatial point lies on a road surface;

FIG. 11 illustrates an image in which the reference spatial point lies at a higher position than a road surface;

DESCRIPTION OF EMBODIMENT

An embodiment will be described below in detail with reference to the accompanying drawings.

While inventing the present embodiment, observations were made regarding a related art. Such observations include the following, for example.

Figure 1:
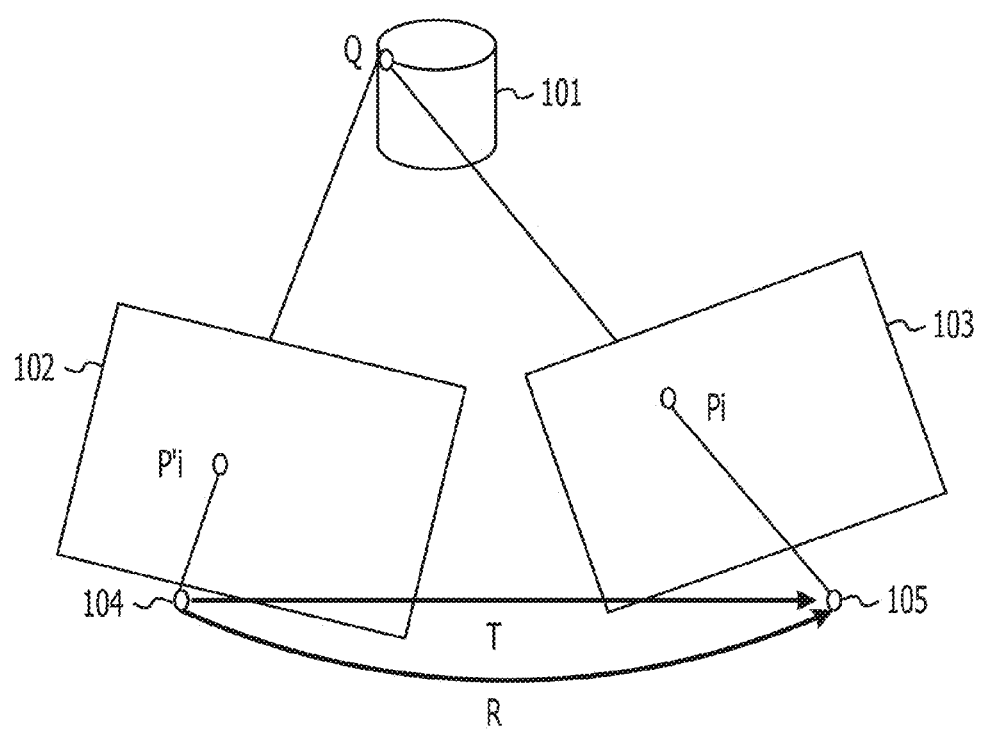
FIG. 1 illustrates motion parameters between two images.

FIG. 1 illustrates motion parameters between two images, in the above-described movement distance estimating methods of the related art, for example. The relative position and attitude of a vehicle-mounted camera between a previous time and a current time can be represented by translation T and rotation R of a projection center 105 of an image 103 at the current time relative to a projection center 104 of an image 102 at the previous time. If the translation T is determined, it is possible to determine a movement distance and a movement speed between the previous time and the current time.

By using the estimated motion parameters and the correspondence relationship between a feature point detected from the image 102 and a feature point detected from the image 103, it is possible to determine, in a three-dimensional space, the position of spatial points corresponding to those feature points through use of triangulation. For example, if it is known that a feature point $p'_i$ in the image 102, which corresponds to a spatial point Q on an object 101, and a feature point $p_i$ in the image 103, which corresponds to the spatial point Q, correspond to each other, it is possible to determine the three-dimensional coordinates of the spatial point Q.

The three-dimensional coordinates (X, Y, Z) of the spatial point Q can be represented by homogeneous coordinates {X, Y, Z, 1}, and two-dimensional coordinates (ui, vi) of the feature point $p_i$ in the image 103 can be represented by homogeneous coordinates {ui, vi, 1}. In this case, {ui, vi, 1} and {X, Y, Z, 1} have a relationship given by:

$$\begin{bmatrix} ui \\ vi \\ 1 \end{bmatrix} = sA[R1T1] \begin{bmatrix} X \\ Y \\ Z \\ 1 \end{bmatrix} \quad (1)$$

Equation (1) represents a perspective projection from the three-dimensional coordinate system of the spatial point Q to an image coordinate system at the current time. The matrix A in equation (1) corresponds to internal parameters of the vehicle-mounted camera and is given by:

$$A = \begin{bmatrix} \alpha u & 0 & u0 \\ 0 & \alpha v & v0 \\ 0 & 0 & 1 \end{bmatrix} \quad (2)$$

In equation (2), u0 and v0 represent a u coordinate and a v coordinate, respectively, at an intersection of an optical axis of the vehicle-mounted camera and a uv plane, and αu and αv represent a unit length on a u-axis and a unit length on a v-axis, respectively.

In equation (1), R1 represents the rotation from the three-dimensional coordinate system of the spatial point Q to the image coordinate system at the current time, and T1 represents the translation from the three-dimensional coordinate system of the spatial point Q to the image coordinate system at the current time. R1 and T1 are given by:

$$R1 = \begin{bmatrix} r1 & r2 & r3 \\ r4 & r5 & r6 \\ r7 & r8 & r9 \end{bmatrix} \quad (3.1)$$

$$T1 = \begin{bmatrix} dx \\ dy \\ dz \end{bmatrix} \quad (3.2)$$

The matrix [R1T1] in equation (1) corresponds to external parameters of the vehicle-mounted camera, and through use of the elements of R1 in equation (3.1) and the elements of T1 in equation (3.2), the matrix [R1T1] is given by:

$$[R1T1] = \begin{bmatrix} r1 & r2 & r3 & dx \\ r4 & r5 & r6 & dy \\ r7 & r8 & r9 & dz \end{bmatrix} \quad (3.3)$$

A scale s for equation (1) represents indefiniteness of a constant multiple of the translation T1 from the three-dimensional coordinate system to the image coordinate system. In other words, the scale s can also be said to represent the ratio of a distance in the three-dimensional coordinate system to a distance in the real world. Therefore, if the value of the scale s can be determined by some kind of algorithm, multiplying the magnitude of the relative translation T in FIG. 1 by the scale s makes it possible to estimate the actual movement distance between the previous time and the current time.

The above-described movement distance estimating methods of the related art have the following disadvantages.

In vehicle driving environments, there are cases in which road-surface patterns with which forward or backward movement of a vehicle can be identified exist on road surfaces. Examples of such road-surface patterns include edges of stripes on crosswalks, edges of dashed lines, and edges of numbers on speed signs. In such cases, the distance measuring device disclosed in Japanese Laid-open Patent Publication No. 2006-349607 can calculate a scale s by utilizing a feature point in a road-surface pattern in video as a fixed point.

Figure 2:
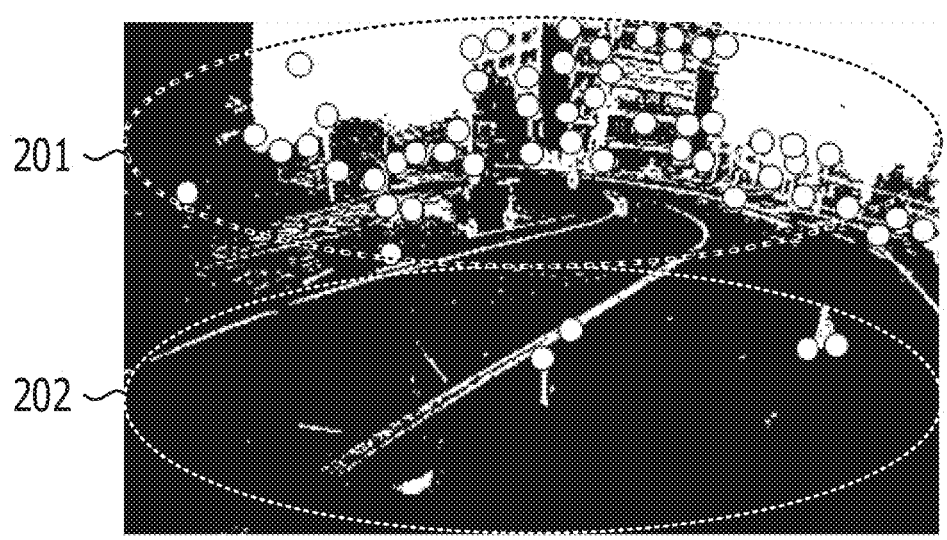
FIG. 2 illustrates a driving environment in which a road-surface pattern is insufficient.

However, there may be driving environments in which, with actual video from a drive recorder, patterns that provide feature points are insufficient in a road-surface area or no road-surface pattern exists, as in the case of an alley or the like. For example, in an image like that depicted in FIG. 2, a large number of feature points denoted by white dots are detected from a background area 201, whereas only a small number of feature points can be detected from a road-surface area 202. In such a case, it is difficult to determine a plane equation for an approximate plane by utilizing feature points in a road-surface pattern, thus making it difficult to calculate a scale s.

In contrast, when a correction coefficient is determined based on photographic-target distance information resulting from measurement performed by a distance sensor, as in the three-dimensional-information restoration device disclosed in Japanese Laid-open Patent Publication No. 2006-337075, it is possible to calculate a scale s even when there is an insufficient number of road-surface patterns. This case, however, is based on the premise that the vehicle is equipped with a distance sensor in addition to a monocular camera.

Accordingly, it is desired to provide a technology that is capable of estimating the movement distance of a vehicle based on video from a vehicle-mounted camera even in a driving environment in which a road-surface pattern is insufficient. The problems described above are not only limited to vehicles that travel on road surfaces but also occur with other moving bodies that move on road surfaces.

The present inventors have found that, even in the absence of a road-surface pattern that is sufficient to determine whether a moving body has moved forward or backward on a road surface, it is possible to determine a scale by utilizing other features in the video. Examples of the features other than the road-surface pattern include feature points of an object that exists in an area other than the road-surface area.

Therefore, the present embodiment provides, for example, a technology that is capable of estimating a movement distance based on video captured from a moving body moving on a road surface, even when a road-surface pattern is insufficient.

Figure 3:
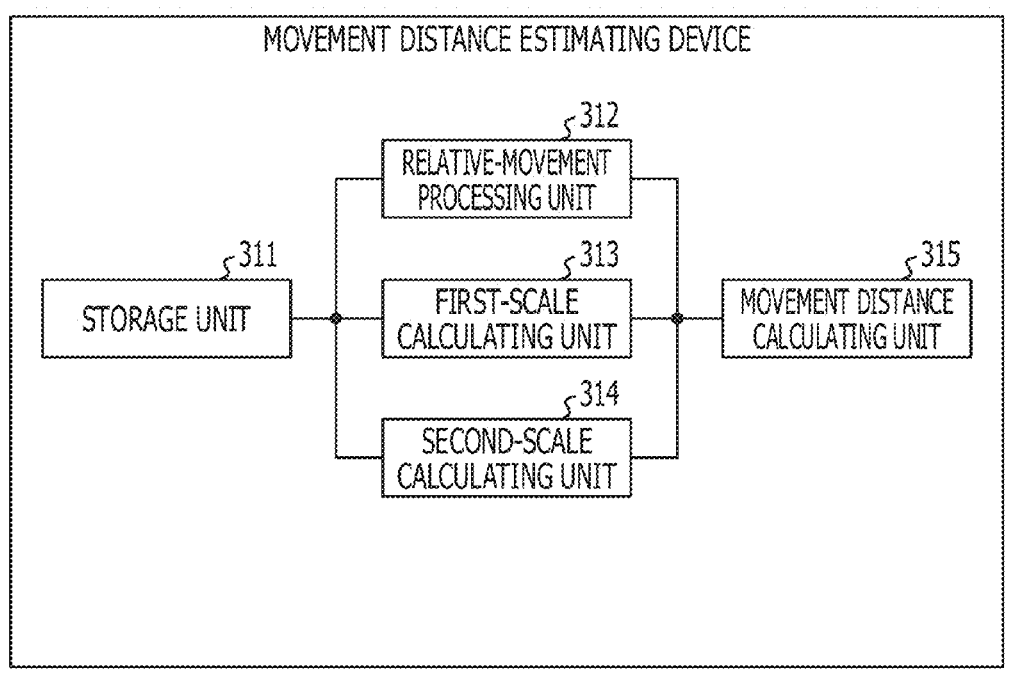
FIG. 3 illustrates a first functional configuration of a movement distance estimating device.

FIG. 3 illustrates a first functional configuration example of a movement distance estimating device. A movement distance estimating device 301 illustrated in FIG. 3 includes a storage unit 311, a relative-movement processing unit 312, a first-scale calculating unit 313, a second-scale calculating unit 314, and a movement distance calculating unit 315.

The storage unit 311 stores therein video information captured by an image capture device mounted on a moving body. The moving body may be an object that moves on a road surface. Examples include a vehicle, a motorcycle, a bicycle, and a self-propelled robot. The object that moves on a road surface may be an animal. The image capture device may be implemented by, for example, a monocular camera.

The relative-movement processing unit 312, the first-scale calculating unit 313, and the second-scale calculating unit 314 are functional units that execute processing according to the embodiment by using the video information stored in the storage unit 311. The movement distance calculating unit 315 is a functional unit that determines a movement distance of the moving body by using processing results of the relative-movement processing unit 312, the first-scale calculating unit 313, and the second-scale calculating unit 314.

Figure 4:
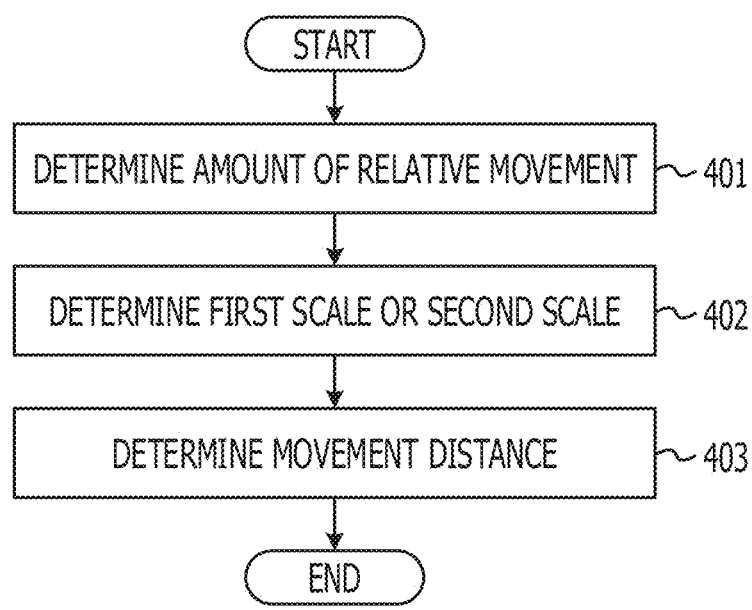
FIG. 4 is a flowchart illustrating first movement distance estimation processing.

FIG. 4 is a flowchart illustrating an example of movement distance estimation processing executed by the movement distance estimating device 301 illustrated in FIG. 3.

First, in step 401, the relative-movement processing unit 312 refers to video information stored in the storage unit 311 and determines an amount of relative movement of the moving body between a first time point and a second time point based on a first image and a second image included in the video information. The first time point is the time at which the first image was captured, and the second time point is the time at which the second image was captured.

In step 402, the first-scale calculating unit 313 refers to the video information stored in the storage unit 311 and determines a first scale for the amount of relative movement based on a partial image in a road-surface area in a third image included in the video information. When it fails to determine the first scale, the second-scale calculating unit 314 refers to the video information stored in the storage unit 311 and determines a second scale for the amount of relative movement based on a predetermined condition. This predetermined condition is that a spatial point in a three-dimensional space, the spatial point corresponding to a feature point in an area other than the road-surface area, exists on a road surface.

In step 403, based on the amount of relative movement and the first scale or the amount of relative movement and the second scale, the movement distance calculating unit 315 determines a movement distance of the moving body between the first time point and the second time point.

According to such movement distance estimation processing, even when a road-surface pattern is insufficient, a movement distance can be estimated based on video captured from a moving body moving on a road surface.

Figure 5:
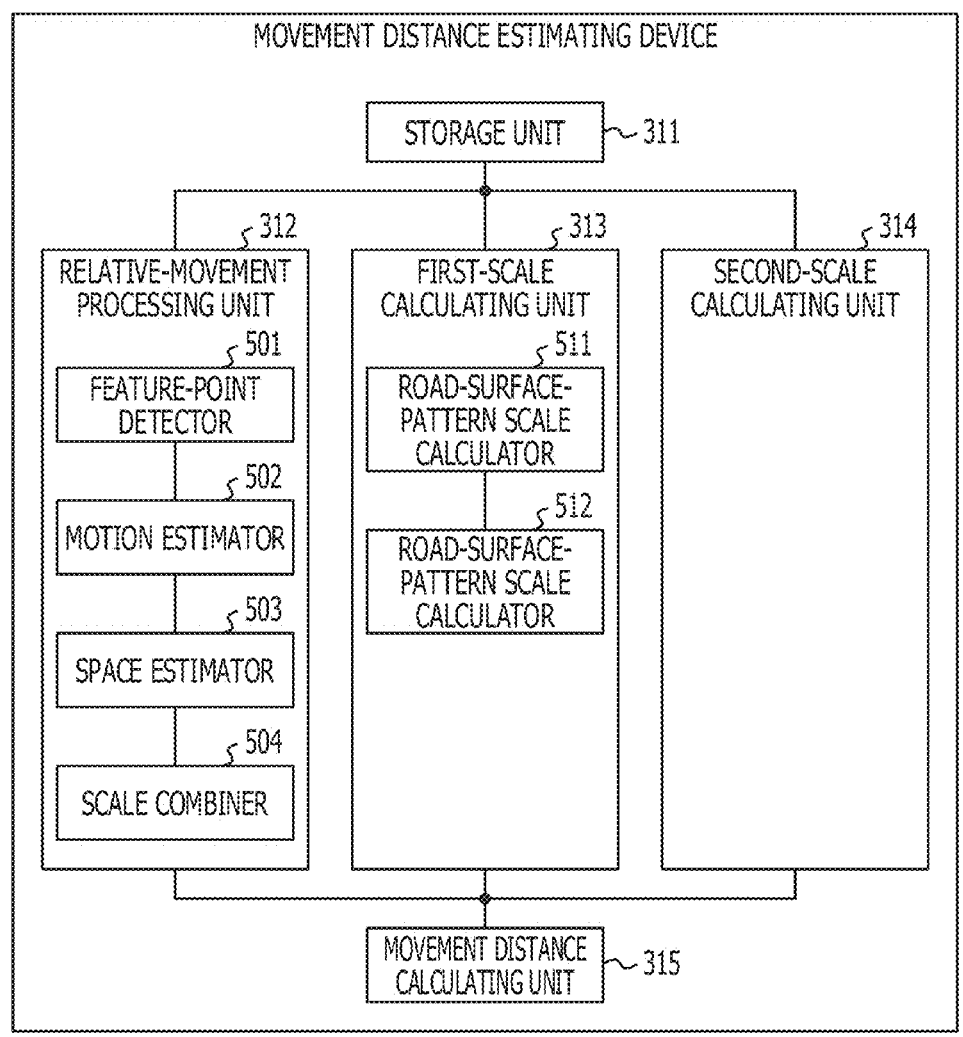
FIG. 5 illustrates a second functional configuration of the movement distance estimating device.

FIG. 5 illustrates a second functional configuration example of the movement distance estimating device. In a movement distance estimating device 301 illustrated in FIG. 5, a relative-movement processing unit 312 includes a feature-point detector 501, a motion estimator 502, a space estimator 503, and a scale combiner 504. A first-scale calculating unit 313 includes a road-surface-pattern scale calculator 511 and a dividing-line scale calculator 512.

The video information stored in the storage unit 311 is, for example, data of time-sequential images of vehicle surroundings which were captured by a vehicle-mounted camera. Pieces of information regarding time points at which the respective images were captured are associated therewith.

Figure 6:
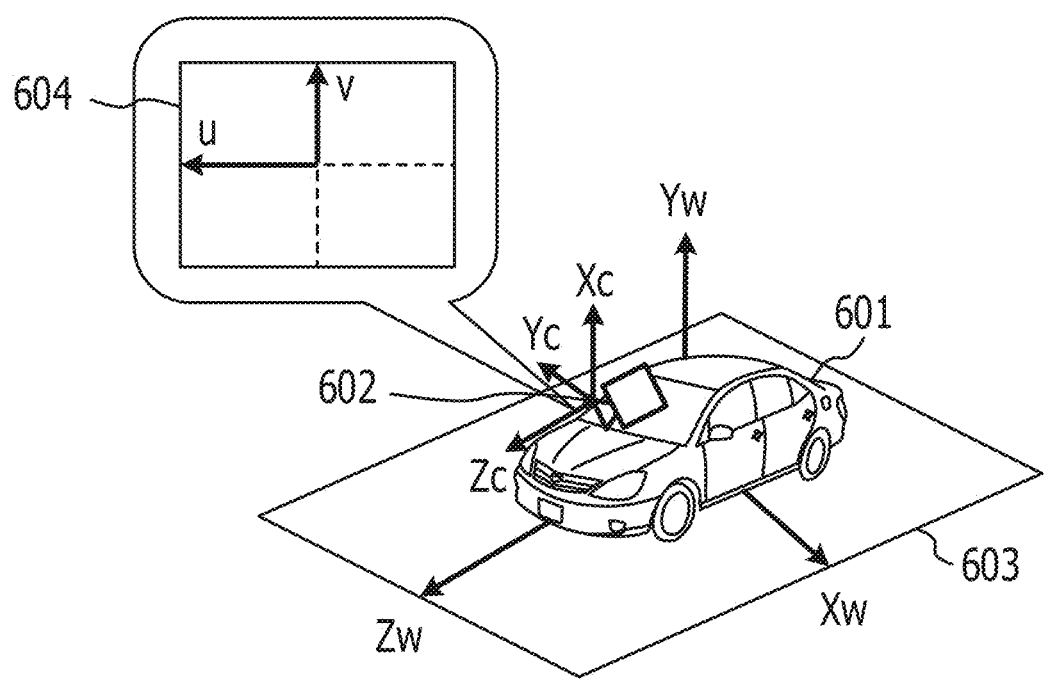
FIG. 6 illustrates a camera coordinate system, an image coordinate system, and a global coordinate system.

FIG. 6 illustrates an example of a camera coordinate system of the vehicle-mounted camera, an image coordinate system, and a global coordinate system in a three-dimensional space. The origin of a camera coordinate system XcYcZc illustrated in FIG. 6 lies at the position of a focal point of a vehicle-mounted camera 602 mounted on a vehicle 601. The Zc-axis extends along an optical axis of the vehicle-mounted camera 602, and the Xc-axis and the Yc-axis lie on a plane that is orthogonal to the optical axis.

In an image coordinate system uv on a camera image 604 of the vehicle-mounted camera 602, the u-axis is a horizontal coordinate axis of the camera image 604 and the v-axis is a vertical coordinate axis of the camera image 604.

A global coordinate system XwYwZw in the three-dimensional space is a coordinate system for describing three-dimensional coordinates (global coordinates) of spatial points, and the origin of the global coordinate system XwYwZw lies on a road surface 603 immediately below the vehicle 601. The Xw-axis is a coordinate axis in the left-and-right directions of the vehicle 601, the Yw-axis is a coordinate axis in a direction perpendicular to the road surface 603, and the Zw-axis is a coordinate axis in the front-and-back directions of the vehicle 601. In this case, the XwZw plane is a plane that is parallel to the road surface 603.

The definitions of the camera coordinate system XcYcZc, the image coordinate system uv, and the global coordinate system XwYwZw illustrated in FIG. 6 are merely examples, and coordinate systems having positions and attitudes that are different from those illustrated may also be used.

First, processing performed by the relative-movement processing unit 312 will be described. By using an image at one time point in the video information and an image at a time that is a predetermined amount of time earlier than that time point, the feature-point detector 501 in the relative-movement processing unit 312 detects groups of feature points between two images and time-sequentially tracks the groups of feature points.

Based on the optical flow of the detected groups of feature points, the motion estimator 502 determines, as motion parameters between the images, a relative translation T and a rotation R that satisfy a correspondence relationship of the groups of feature points between the two images. The magnitude of the relative translation T indicates an amount of relative movement of the vehicle 601 between the two time points at which the two images are captured.

By using correspondence relationships between the groups of feature points in the two images captured at the two time points and the motion parameters between the images, the space estimator 503 determines the global coordinates of spatial points corresponding to the respective feature points. In this case, by using triangulation, the space estimator 503 determines, as the global coordinates of spatial points corresponding to the feature points, global coordinates an intersection of ray vectors pointing from the position of the vehicle-mounted camera 602 to the feature points at the respective time points.

At this stage, a tentative scale having an appropriate value is used as the scale s for equation (1) noted above. For example, the tentative scale may be determined assuming that the distance between the positions of the vehicle-mounted camera 602 at two time points is "1".

In order to integrate spatial points determined from pairs of different images to make multiple sets of the global coordinates of the same spatial point match each other, the scale combiner 504 combines the determined tentative scales with the respective pairs of images. In this case, the scale combiner 504 can combine the tentative scales so as to minimize the sum of squares of an error between the global coordinates of the spatial points, for example, based on the three-dimensional environment generation method described in Kawanishi Ryosuke, Yamasita Atsushi, and Kaneko Toru, "3D Environment Model Generation Based on Feature-Point Flow Model Using Omnidirectional Camera", MIRU2009, July, 2009.

Figure 7:
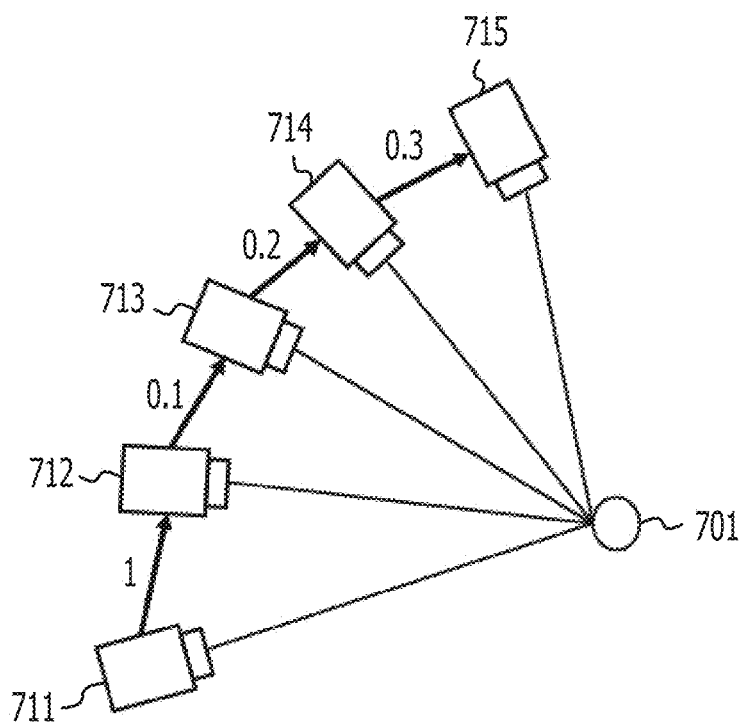
FIG. 7 illustrates a relative movement relationship.

For example, as illustrated in FIG. 7, when the vehicle-mounted camera 602 captures images of a spatial point 701 while moving from a position 711 to a position 715, one tentative scale is determined for a pair of images captured at the position 711 and the position 712.

Similarly, one tentative scale is determined for a pair of images captured at the position 712 and the position 713, and one tentative scale is determined for a pair of images captured at the position 713 and the position 714. In addition, one tentative scale is determined for a pair of images captured at the position 714 and the position 715. Combining those tentative scales makes it possible to determine a relative relationship in movement from the position 711 to the position 715.

In the example in FIG. 7, when the movement distance in the section from the position 711 to the position 712 is assumed to be 1, the movement distance in the section from the position 712 to the position 713 is 0.1. Similarly, the movement distance in the section from the position 713 to the position 714 is 0.2, and the movement distance in the section from the position 714 to the position 715 is 0.3. Thus, the movement distance in all of the sections from the position 711 to the position 715 is 1.6 times the movement distance in the section from the position 711 to the position 712.

For example, the bundle adjustment described in Okatani Takayuki, "Bundle Adjustment", *IPSJ SIG Technical Report*, 2009 may be used in order to reduce a cumulative error that occurs during combining of the tentative scales.

A description will be given of processing performed by the first-scale calculating unit 313. The road-surface-pattern scale calculator 511 in the first-scale calculating unit 313 sets a road-surface area in an image at each time point and identifies a partial image in the road-surface area. The road-surface-pattern scale calculator 511 then calculates the scale s for equation (1) based on the movement of a feature point in a road-surface pattern which exists in the partial image in the road-surface area.

In this case, the road-surface-pattern scale calculator 511 may calculate the scale s, for example, by using the method disclosed in Patent Document 1. First, the road-surface-pattern scale calculator 511 determines a plane equation (a road-surface equation) for an approximate plane representing the road surface 603, based on the global coordinates of a spatial point corresponding to the feature point in the road-surface pattern. Based on the road-surface equation, the road-surface-pattern scale calculator 511 determines the height of the camera viewpoint of the vehicle-mounted camera 602 from the approximate plane in the global coordinate system. The road-surface-pattern scale calculator 511 then calculates a scale s based on the height of the camera viewpoint from the approximate plane and the mounting height of the vehicle-mounted camera 602 from the road surface 603.

However, when there is no sufficient road-surface pattern and a sufficient number of feature points do not exist in the road-surface area, there are cases in which it is significantly difficult to calculate the scale s based on the feature points in a road-surface pattern. In such a case, the dividing-line scale calculator 512 detects a lane-dividing line, such as a white line, from a partial image in a road-surface area and calculates a scale s based on changes in the distance between the vehicle 601 and the lane-dividing line.

Although lane-dividing lines are also one type of road-surface pattern, it is difficult to detect feature points from images of a lane-dividing line when the lane-dividing line extends continuously in the vehicle traveling direction. In such a case, for example, with the method disclosed in Japanese Laid-open Patent Publication No. 2002-236912, it is possible to detect a lane-dividing line from a partial image in a road-surface area. For example, with the method disclosed in Japanese Laid-open Patent Publication No. 2002-352226, it is possible to determine a distance between the vehicle 601 and a lane-dividing line in the real world, by calculating model parameters of a road surface 603 based on position information of a detected lane-dividing line and using the calculated model parameters.

Figure 8:
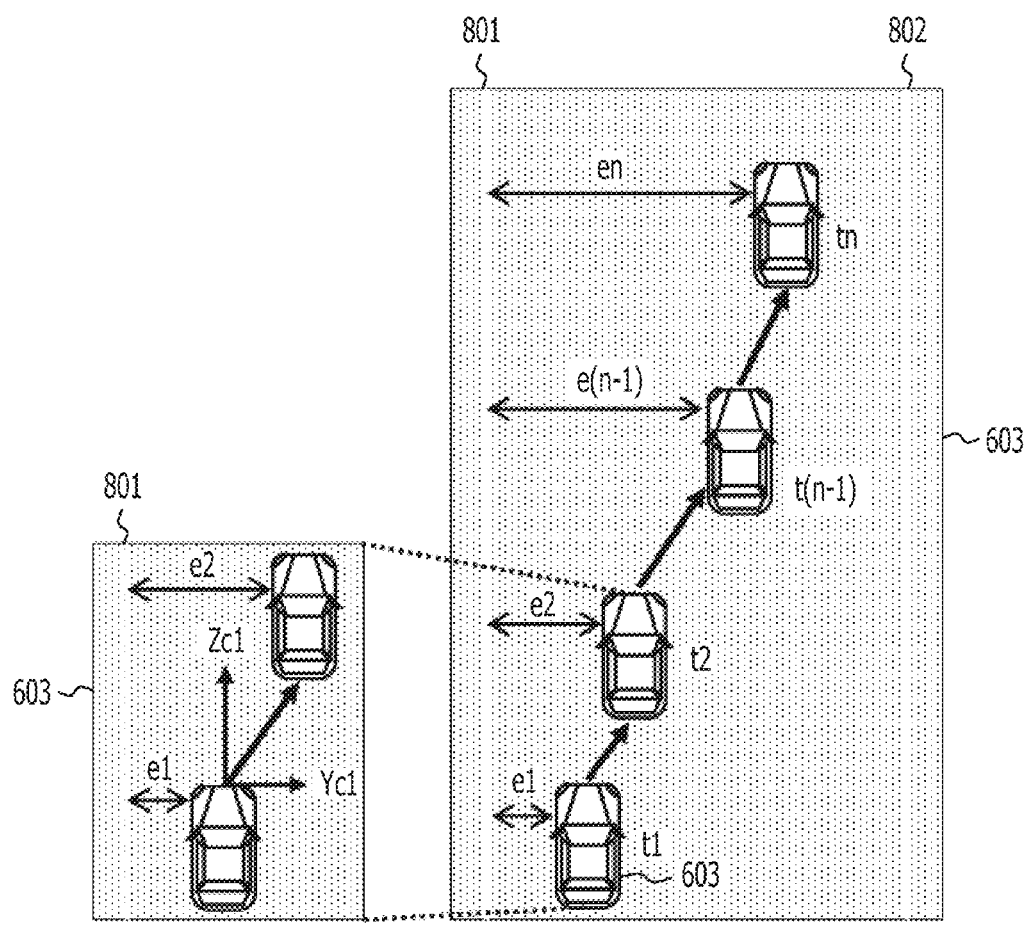
FIG. 8 illustrates changes in the distance between a vehicle and a lane-dividing line.

FIG. 8 illustrates changes in the distance between the vehicle 601 and a lane-dividing line. On a road surface 603 illustrated in FIG. 8, a lane-dividing line 801 and a lane-dividing line 802 exist at the left side and the right side, respectively, of a lane in which the vehicle 601 is traveling. A description below is given of a method for calculating a scale s by using the lane-dividing line 801.

Distances ej in the left-and-right directions (in the lateral directions) between the vehicle 601 and the lane-dividing line 801 are obtained from images at time points tj (j=1 to n). In this case, an amount of change $\Delta e$ in the distance from time t1 to time tn is given by:

$$\Delta e = |en - e1| \quad (4)$$

In this case, n is an integer greater than or equal to 2. When the amount of change $\Delta e$ in equation (4) is larger than or equal to a threshold th, the scale s may be calculated in accordance with:

$$s = \Delta e / \Delta Yc \quad (5)$$

In equation (5), $\Delta Yc$ represents a Yc component in the translation of the vehicle 601 from time t1 to time tn in the camera coordinate system XcYcZc. For example, the Yc component and a Zc component in the translation of the vehicle 601 from time t1 to time t2 are Yc1 and Zc1, respectively. The amount of change $\Delta e$ in the distance from time t1 to time t2 is given by:

$$\Delta e = |e2 - e1| \quad (6)$$

When the amount of change $\Delta e$ in equation (6) is larger than or equal to the threshold th, the scale s may be calculated using the amount of change $\Delta e$ and the Yc component Yc1 in the translation, in accordance with:

$$s = \Delta e / Yc1 \quad (7)$$

Similarly, the scale s may also be calculated using the lane-dividing line 802.

If no lane-dividing line is detected or if the amount of change $\Delta e$ in equation (4) does not exceed the threshold th even when a lane-dividing line is detected, then the second-scale calculating unit 314 calculates the scale s.

The second-scale calculating unit 314 varies the tentative scale to determine, as the scale s, the tentative scale obtained when a spatial point that is included in spatial points corresponding to feature points in an area other than the road-surface area and that is relatively close to the road surface 603 contacts the road surface 603. For example, by determining a scale s when a spatial point that is the closest to the road surface 603 contacts the road surface 603, it is possible to determine an optimum scale s.

In this case, varying the tentative scale corresponds to enlarging or reducing and moving the positions of spatial points in accordance with changes in the tentative scale while maintaining the relative positional relationship of the spatial points, with the camera viewpoint of the vehicle-mounted camera 602 serving as the origin thereof. An increase in the tentative scale causes the spatial points to move away from the camera viewpoint, and a reduction in the tentative scale causes the spatial points to move toward the camera viewpoint.

Figure 9:
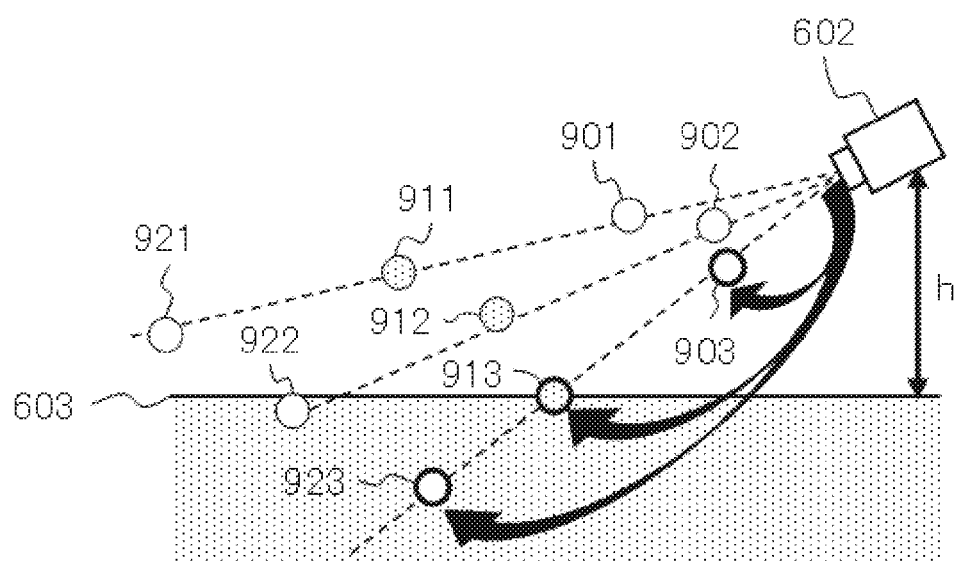
FIG. 9 illustrates a relationship between the positions of three spatial points and a tentative scale.

FIG. 9 illustrates a relationship between the positions of three spatial points in a three-dimensional space and the tentative scale. It is assumed that the vehicle-mounted camera 602 is mounted at a position at a height h from a road surface 603 and three spatial points are obtained as a collection of spatial points corresponding to feature points in an area other than a road-surface area. The three spatial points before the tentative scale is varied lie at positions 901 to 903. For example, when the tentative scale is excessively increased, the three spatial points move to positions 921, 922, and 923 and the positions 922 and 923 become lower than the position of the road surface 603 which is defined by the height h. Thus, this is a situation that is unlikely in practice.

In order to ensure that none of the spatial points move to below the road surface 603, it is desirable that the tentative scale be varied so that a reference spatial point that is the lowermost spatial point included in the collection of spatial points moves to a position 913 on the road surface 603. In this case, the three spatial points move to positions 911, 912, and 913, respectively.

FIG. 10 illustrates an example of an image in which a reference spatial point lies on a road surface 603. Since the lowermost spatial point of the three spatial points in FIG. 10 lies at a position where the road surface 603 and a building contact each other, moving this spatial point to a position 1003 on the road surface 603 makes it possible to determine a correct scale s. In this case, the three spatial points move to positions 1001, 1002, and 1003, respectively.

FIG. 11 illustrates an example of an image in which the reference spatial point lies at a higher position than a road surface 603. The lowermost spatial point of three spatial points in FIG. 11 lies at a position at a height a from the road surface 603. Thus, when the lowermost spatial point is moved to a position 1113 on the road surface 603, the scale s has a larger value than its correct value. In this case, the three spatial points move from positions 1101, 1102, and 1103 to positions 1111, 1112, and 1113, respectively.

Thus, the value of the scale s individually determined from an image at each time point varies depending on whether or not a spatial point corresponding to any feature point included in the image lies on the road surface 603. Hence, there are cases in which the correct scales s are not obtained at all time points. However, when video is captured over a certain period of traveling time, an image in which the reference spatial point contacts the road surface 603 is presumably obtained at any of the time points. A scale s determined from an image in which the reference spatial point lies at a position higher than the road surface 603 is presumed to have a larger value than the correct value.

Paying attention to the above-described considerations, the present inventors have noticed that selecting a relatively small value of scales s determined from multiple images at multiple time points, the images being included in video information, makes it possible to determine a value that is close to the correct scale s. In particular, if the smallest value of the scales s can be selected, presumably a value that is the closest to the correct scale s can be obtained.

Figure 12:
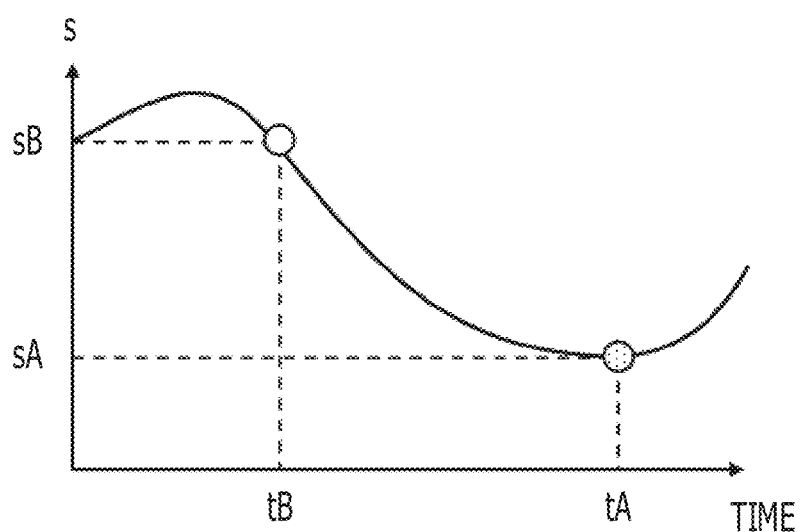
FIG. 12 illustrates changes in a scale s according to time points.

FIG. 12 illustrates an example of changes in the scale s according to time points at which images are captured during a period of traveling time. For example, since the reference spatial point at time tB lies at a higher position than the road surface 603, as illustrated in FIG. 11, an erroneous scale sB is obtained. At subsequent time tA, however, an image in which the reference spatial point contacts the road surface 603 is captured, as illustrated in FIG. 10, and a correct scale sA is obtained. Since the scale sA corresponds to the smallest value of the scales s obtained from the images at the time points during the period of traveling time, selecting the smallest value makes it possible to determine the correct scale sA.

When the spatial point Q described above corresponds to the position of the feature point $p_i$ in an image, the scale s satisfies equation (1) noted above. Similarly to the space estimator 503, the second-scale calculating unit 314 determines global coordinates of spatial points corresponding to feature points included in an image at each time point and a tentative scale, based on equation (1), and selects the lowermost spatial point of the spatial points as a reference spatial point. For example, when the global coordinate system XwYwZw illustrated in FIG. 6 is used as a three-dimensional coordinate system of spatial points, a spatial point at which the Yw coordinate is the smallest is selected as the reference spatial point.

The second-scale calculating unit 314 varies the tentative scale for the reference spatial point to determine a scale s when the reference spatial point contacts the road surface 603. The second-scale calculating unit 314 then selects, as an optimum scale s, the smallest value of scales s obtained from an image at each time point.

When any of the road-surface-pattern scale calculator 511, the dividing-line scale calculator 512, and the second-scale calculating unit 314 determines a scale s, the movement distance calculating unit 315 calculates a movement distance D of the vehicle 601 between two desired time points.

In this case, the movement distance calculating unit 315 may determine the movement distance d of the vehicle 601 between two time points at which two mages are captured, by multiplying the magnitude of the relative translation T between the two images by the scale s, the relative translation T being obtained by the motion estimator 502. In addition, the movement distance calculating unit 315 may obtain the movement distance D between two desired time points by multiplying the movement distance d by a rate of movement distances over multiple sections, based on the relative movement relationship determined by the scale combiner 504.

The movement distance calculating unit 315 uses the movement distance D and a movement time Δt, which is a difference between two time points, to calculate a movement speed V, in accordance with:

$$V = D/\Delta t \quad (8)$$

The movement distance calculating unit 315 then outputs, as an estimation result, at least one of the movement distance D and the movement speed V. When the movement distance calculating unit 315 outputs only the movement distance D as an estimation result, the calculation of the movement speed V is omitted.

For example, when a travel range to be processed corresponds to all sections from the position 711 to the position 715 in FIG. 7, the movement distance D is given by 1.6×0.3×|T|(m), where |T|(m) is the magnitude of the relative translation T, and the scale s is 0.3. In addition, when the movement time Δt from the position 711 to the position 715 is assumed to be 0.4 s, the movement speed V is given by (1.6×0.3×|T|)/0.4 (m/s).

A procedure of movement distance estimation processing performed by the movement distance estimating device 301 illustrated in FIG. 5 will be described with reference to FIGS. 13 to 18.

Figure 13:
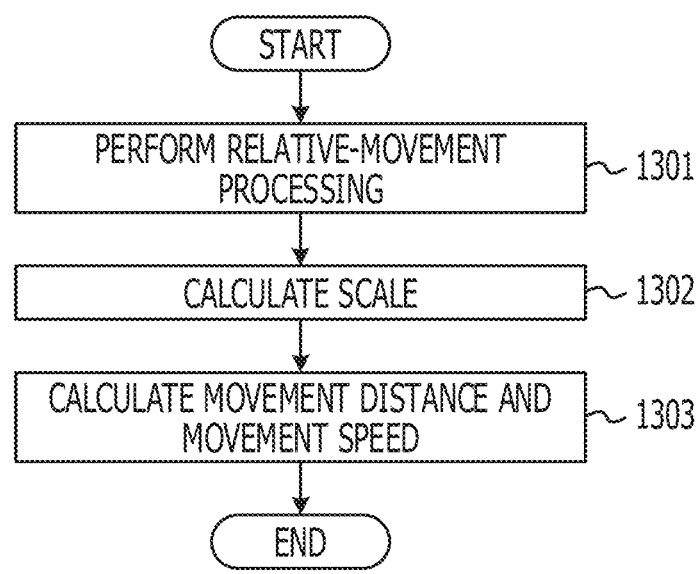
FIG. 13 is a flowchart of movement distance estimation processing.

FIG. 13 is a flowchart illustrating an example of the movement distance estimation processing. In step 1301, the relative-movement processing unit 312 performs relative-movement processing. In step 1302, the first-scale calculating unit 313 or the second-scale calculating unit 314 calculates a scale s. Subsequently, in step 1303, the movement distance calculating unit 315 calculates a movement distance D and a movement speed V and outputs calculation results.

Figure 14:
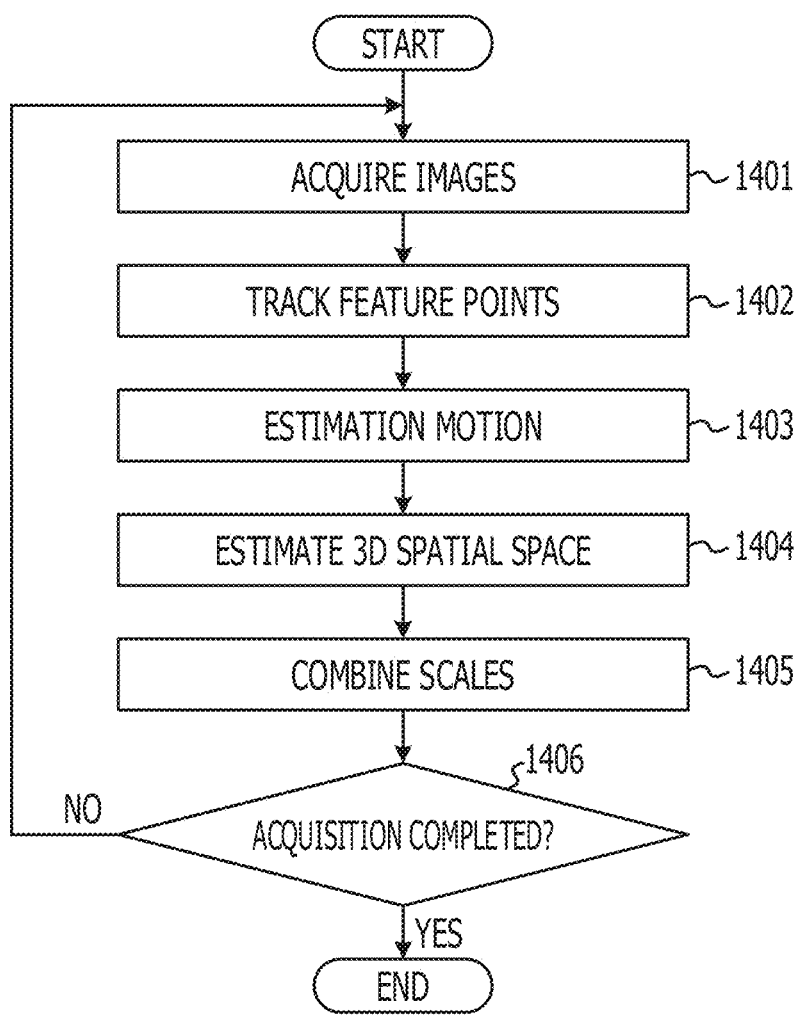
FIG. 14 is a flowchart of the relative-movement processing.

FIG. 14 is a flowchart illustrating an example of the relative-movement processing in step 1301 in FIG. 13. In step 1401, the relative-movement processing unit 312 acquires, from video information stored in the storage unit 311, an image at a start time in a time range to be processed and an image at a time that is a predetermined amount of time later than that start time.

In step 1402, the feature-point detector 501 detects groups of feature points between the acquired two images. In step 1403, the motion estimator 502 determines motion parameters between the two images in accordance with the optical flow of the detected groups of feature points.

In step 1404, by using two corresponding feature points between the two images, the motion parameters between the images, and a tentative scale, the space estimator 503 determines global coordinates of spatial points corresponding to the feature points. In step 1405, the scale combiner 504 combines multiple determined tentative scales with respective pairs of different images. However, when the number of processed pairs of images is one and only tentative scale exists, the process in step 1405 is omitted.

In step 1406, the relative-movement processing unit 312 checks whether or not an image at an end time in the time range to be processed has been acquired. When an image at the end time has not been acquired (NO in step 1406), the process returns to step 1401 in which the relative-movement processing unit 312 acquires an image at a next time point after the predetermined amount of time. The relative-movement processing unit 312 then repeats the processes in step 1402 and the subsequent steps by using, as a new pair of images, the last image acquired up to the last time and the image acquired this time.

When the last image acquired up to the last time is an image at the end time (YES in step 1406), the relative-movement processing unit 312 ends the processing.

Figure 15:
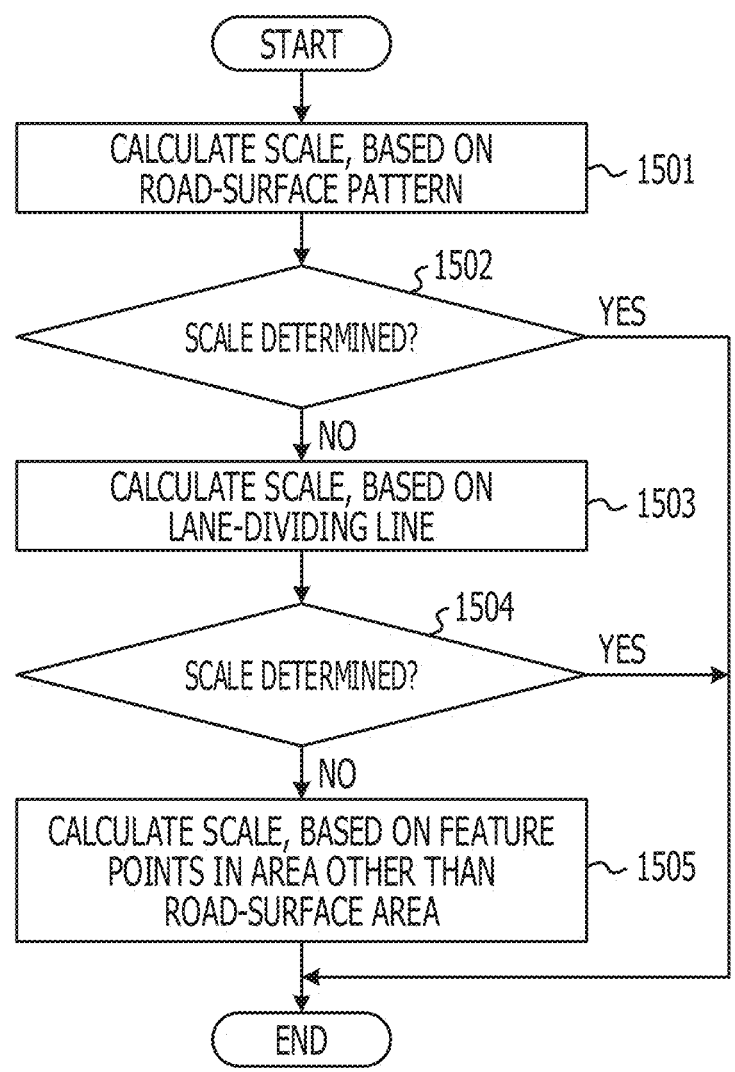
FIG. 15 is a flowchart of scale calculation processing.

FIG. 15 is a flowchart illustrating an example of the scale calculation processing that the first-scale calculating unit 313 and the second-scale calculating unit 314 perform in step 1302 in FIG. 13. In step 1501, by using images in a time range to be processed, the road-surface-pattern scale calculator 511 calculates a scale s based on feature points in a road-surface pattern that exists in a road-surface area. In step 1502, the road-surface-pattern scale calculator 511 checks whether or not the scale s has been determined. When the scale s has been determined (YES in step 1502), the processing ends.

On the other hand, when the scale s has not been determined (NO in step 1502), the process proceeds to step 1503 in which the dividing-line scale calculator 512 calculates a scale s based on a lane-dividing line that exists in the road-surface area. In step 1504, the dividing-line scale calculator 512 checks whether or not the scale s has been determined. When the scale s has been determined (YES in step 1504), the processing ends.

On the other hand, when the scale s has not been determined (NO in step 1504), the process proceeds to step 1505 in which the second-scale calculating unit 314 calculates a scale s based on feature points in an area other than the road-surface area.

Figure 16:
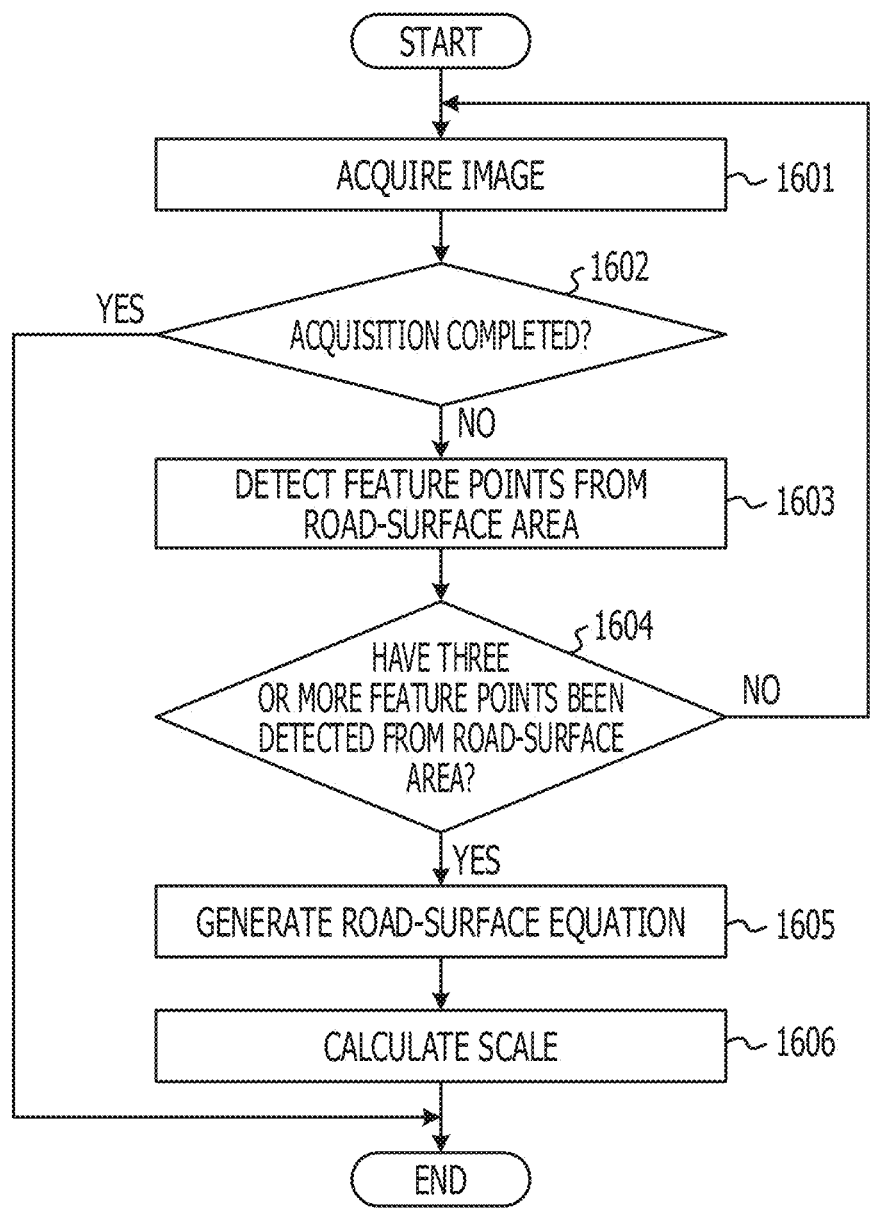
FIG. 16 is a flowchart of scale calculation processing based on feature points in a road-surface area.

FIG. 16 is a flowchart illustrating an example of the scale calculation processing that the road-surface-pattern scale calculator 511 performs in step 1501 in FIG. 15. In step 1601, the road-surface-pattern scale calculator 511 acquires an image at a start time in a time range to be processed from the video information stored in the storage unit 311.

In step 1602, the road-surface-pattern scale calculator 511 checks whether or not an image at an end time in the time range to be processed has been acquired. When an image at the end time has not been acquired (NO in step 1602), the process proceeds to step 1603 in which the road-surface-pattern scale calculator 511 detects feature points from a road-surface area in the acquired image.

In order to generate a road-surface equation, it is desirable to detect three or more feature points from the road-surface area. Accordingly, in step 1604, the road-surface-pattern scale calculator 511 checks whether or not three or more feature points have been detected from the road-surface area.

When three or more feature points have been detected (YES in step 1604), the process proceeds to step 1605 in which the road-surface-pattern scale calculator 511 determines a road-surface equation representing the road surface 603, based on the global coordinates of spatial points corresponding to those feature points.

In step 1606, based on the road-surface equation, the road-surface-pattern scale calculator 511 determines a height from an approximate plane of the camera viewpoint of the vehicle-mounted camera 602 in the global coordinate system. The road-surface-pattern scale calculator 511 then calculates a scale s by dividing the height from the approximate plane of the camera viewpoint by the mounting height of the vehicle-mounted camera 602 from the road surface 603.

For example, when the height from the approximate plane of the camera viewpoint is 0.42 m and the mounting height of the vehicle-mounted camera 602 is 1.4 m, the scale s is 0.3.

On the other hand, when three or more feature points have not been detected (NO in step 1604), the road-surface-pattern scale calculator 511 acquires an image at a next time point in step 1601 and then repeats the processes in step 1602 and the subsequent step. When the image acquired last time is an image at the end time (YES in step 1602), the road-surface-pattern scale calculator 511 ends the processing. In this case, since no scale s has been determined, the process in step 1503 is performed.

Figure 17:
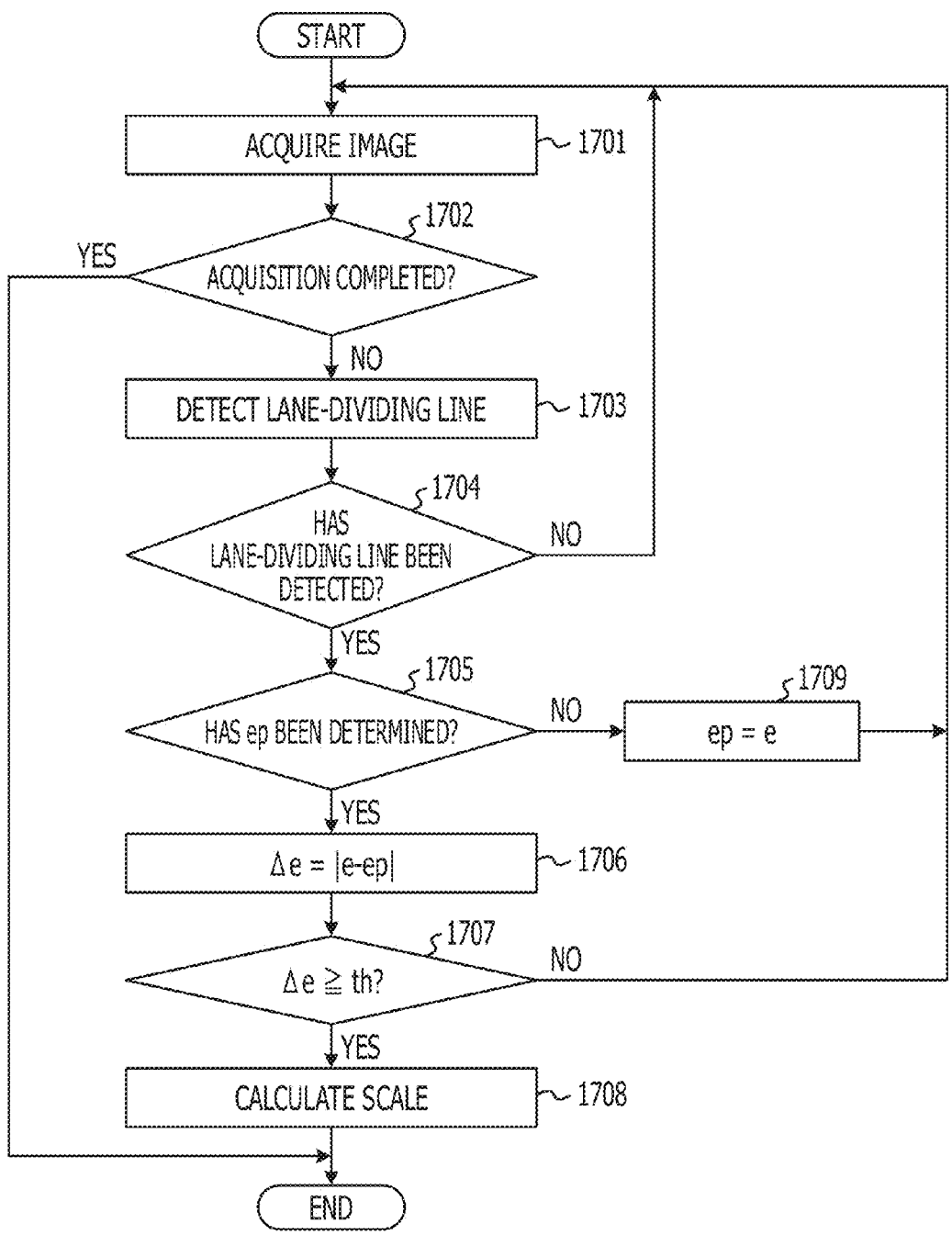
FIG. 17 is a flowchart of scale calculation processing based on a lane-dividing line in a road-surface area.

FIG. 17 is a flowchart illustrating an example of the scale calculation processing that the dividing-line scale calculator 512 performs in step 1503 in FIG. 15. In step 1701, the dividing-line scale calculator 512 acquires an image at a start time in a time range to be processed from the video information stored in the storage unit 311.

In step 1702, the dividing-line scale calculator 512 checks whether or not an image at an end time in the time range to be processed has been acquired. When an image at the end time has not been acquired (NO in step 1702), the process proceeds to step 1703 in which the dividing-line scale calculator 512 detects a lane-dividing line from a partial image in a road-surface area in the acquired image.

In step 1704, the dividing-line scale calculator 512 checks whether or not a lane-dividing line has been detected from the partial image in the road-surface area. When no lane-dividing line has been detected (NO in step 1704), the dividing-line scale calculator 512 acquires an image at a next time point in step 1701 and then repeats the processes in step 1702 and the subsequent step.

On the other hand, when a lane-dividing line has been detected (YES in step 1704), the process proceeds to step 1705 in which the dividing-line scale calculator 512 checks whether or not a lateral reference distance ep between the vehicle 601 and the lane-dividing line has been determined. The reference distance ep is determined based on the lane-dividing line initially detected from an image. Thus, when a lane-dividing line is detected from an image for the first time, the reference distance ep has not been determined yet, and when the lane-dividing line is detected from an image at the next or subsequent time, the reference distance ep has already been determined.

When the reference distance ep has not been determined (NO in step 1705), the process proceeds to step 1709 in which the dividing-line scale calculator 512 determines a lateral distance e between the vehicle 601 and the lane-dividing line based on the detected lane-dividing line and sets the distance e as the reference distance ep. In step 1701, the dividing-line scale calculator 512 acquires an image at a next time point. The dividing-line scale calculator 512 then repeats the processes in step 1702 and the subsequent steps.

On the other hand, when the reference distance ep has been determined (YES in step 1705), the process proceeds to step 1706 in which the dividing-line scale calculator 512 determines a lateral distance e between the vehicle 601 and the lane-dividing line based on the detected lane-dividing line and determines the amount of change $\Delta e$ in accordance with:

$$\Delta e = |e - ep| \qquad (9)$$

In step 1707, the dividing-line scale calculator 512 compares the amount of change $\Delta e$ with the threshold th. When the amount of change $\Delta e$ is smaller than the threshold th (NO in step 1707), the dividing-line scale calculator 512 acquires an image at a next time point in step 1701 and then repeats the processes in step 1702 and the subsequent steps.

On the other hand, when the amount of change $\Delta e$ is larger than or equal to the threshold th (YES in step 1707), the process proceeds to step 1708 in which the dividing-line scale calculator 512 calculates a scale s by using the amount of change $\Delta e$ and a lateral component $\Delta Yc$ in the translation of the vehicle 601, in accordance with equation (5) noted above. In this case, $\Delta Yc$ is the Yc component in the translation of the vehicle 601 in a period from the time of the image used to determine the reference distance ep to the time of the image acquired last time.

For example, for $\Delta e=0.54$ (m), Xc1=1.8 (m), and th=0.5 (m), the scale s is 0.3.

When the image acquired last time is an image at the end time (YES in step 1702), the dividing-line scale calculator 512 ends the processing. In this case, since no scale s has been determined, the process in step 1505 is performed.

Figure 18:
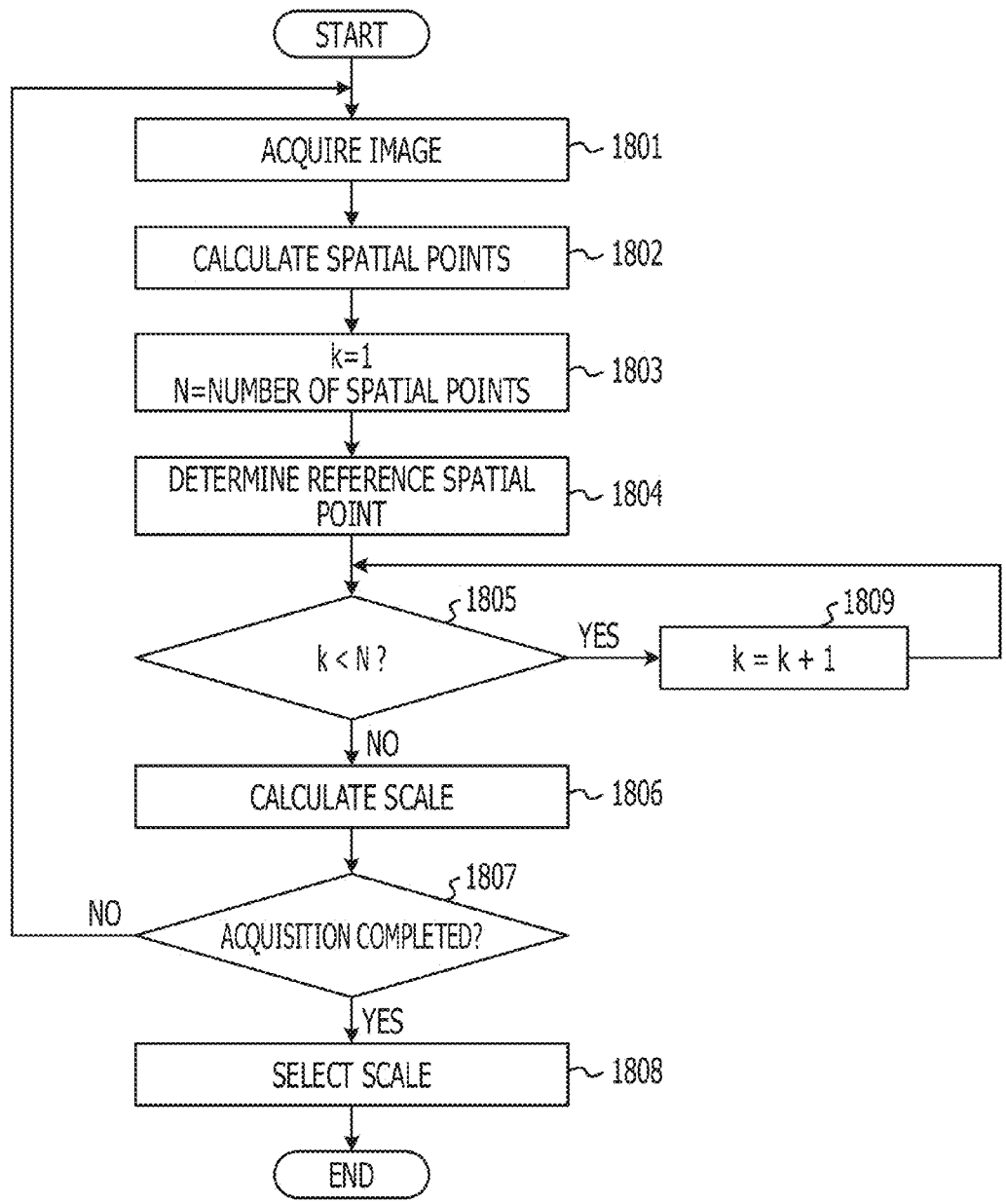
FIG. 18 is a flowchart of the scale calculation processing based on feature points in a road-surface area.

FIG. 18 is a flowchart illustrating an example of the scale calculation processing that the second-scale calculating unit 314 performs in step 1505 in FIG. 15. In step 1801, the second-scale calculating unit 314 acquires an image at a start time in a time range to be processed from the video information stored in the storage unit 311.

In step 1802, the second-scale calculating unit 314 calculates global coordinates of spatial points corresponding to feature points included in the acquired image, as in step 1404 in FIG. 14. In step 1803, the second-scale calculating unit 314 sets the value of a control variable k to 1 and sets the value of a control variable N to the number of obtained spatial points.

In step 1804, the second-scale calculating unit 314 determines, of the first to kth spatial points, a spatial point whose Yw coordinate is relatively small, that is, a spatial point that is relatively close to the road surface 603, as a reference spatial point. The spatial point determined as the reference spatial point may be, of the first to kth spatial points, for example, a spatial point whose Yw coordinate is the smallest, that is, a spatial point that is the closest to the road surface 603. For k=1, the first spatial point is determined as the reference spatial point.

In step 1805, the second-scale calculating unit 314 compares k with N. When k is smaller than N (YES in step 1805), the second-scale calculating unit 314 increments k by 1 in step 1809 and then repeats the processes in step 1804 and the subsequent step.

On the other hand, when k has reached N (NO in step 1805), the process proceeds to step 1806 in which the second-scale calculating unit 314 changes the tentative scale for the reference spatial point to calculate a scale s when the reference spatial point contacts the road surface 603.

In step 1807, the second-scale calculating unit 314 checks whether or not an image at the end time in the time range to be processed has been acquired. When an image at the end time has not been acquired (NO in step 1807), the second-scale calculating unit 314 acquires an image at a next time point in step 1801 and then repeats the processes in step 1802 and the subsequent steps.

On the other hand, when the image acquired last time is an image at the end time (YES in step 1807), the process proceeds to step 1808 in which the second-scale calculating unit 314 selects, as an optimum scale s, a scale having a relatively small value from multiple scales s determined based on multiple images at multiple time points. The optimum scale s selected may be, for example, the smallest value of the scales s.

For example, when a scale s calculated from one image is 1.6 and a scale s calculated from another image is 0.3, the optimum scale s is determined to be 0.3.

Figure 19:
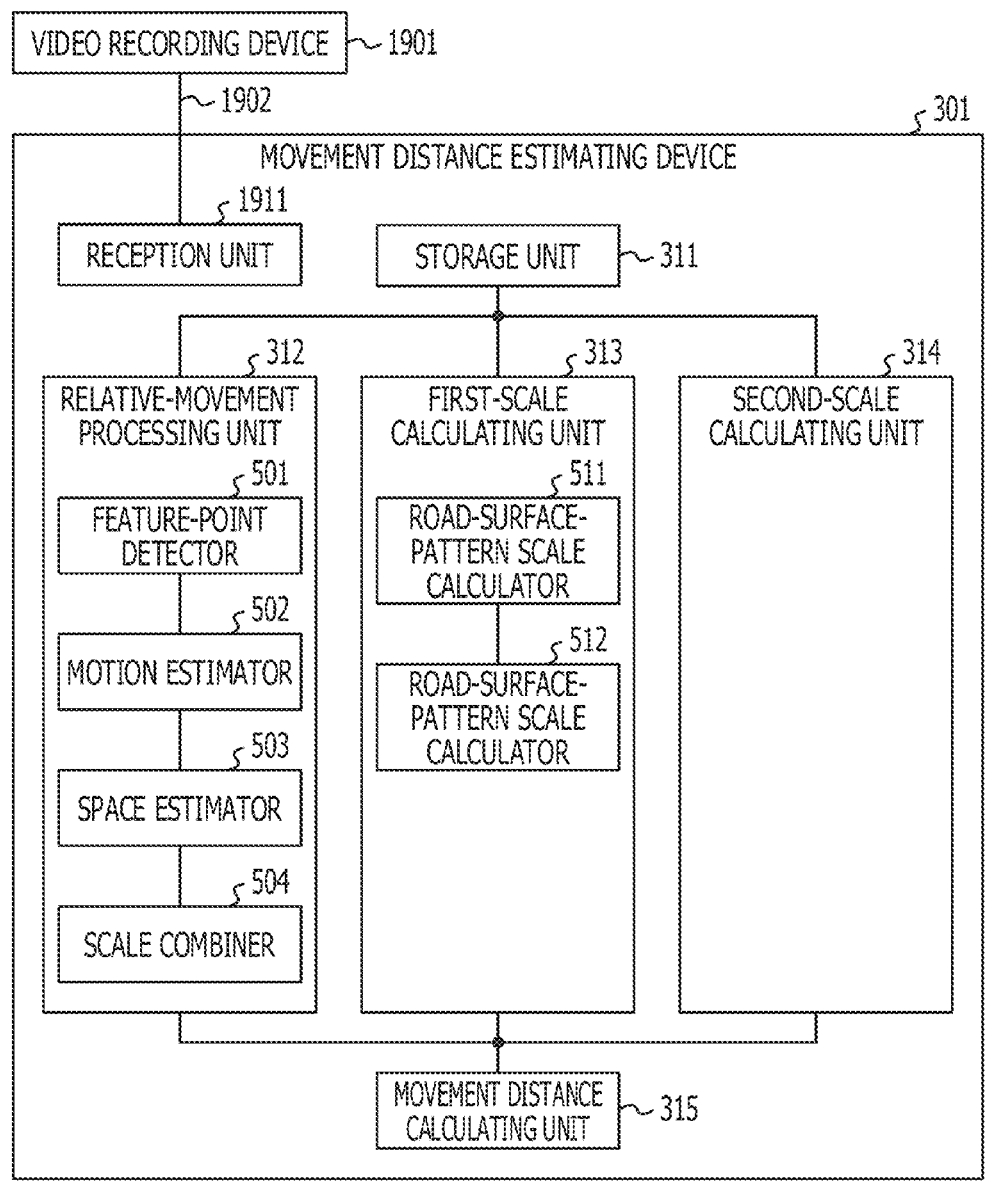
FIG. 19 illustrates a third functional configuration of the movement distance estimating device.

FIG. 19 illustrates a third functional configuration example of the movement distance estimating device. The movement distance estimating device 301 in FIG. 19 has a configuration in which a reception unit 1911 is added to the movement distance estimating device 301 illustrated in FIG. 5.

The reception unit 1911 receives video information from a video recording device 1901 through a communications network 1902 and transfers the received video information to the storage unit 311. The movement distance estimating device 301 performs movement distance estimation processing by using the video information stored in the storage unit 311.

According to the movement distance estimating device 301 illustrated in FIG. 19, for example, it is possible to estimate a movement distance and a movement speed of the vehicle 601 while receiving, in real time, video information from the video recording device 1901, such as a drive recorder, mounted on the vehicle 601.

The configurations of the movement distance estimating device 301 illustrated in FIGS. 5 and 19 are merely examples, and one or some of the constituent elements may be omitted or changed depending on the application or condition of the movement distance estimating device 301. For example, when multiple determined tentative scales may or may not to be applied to pairs of different images, the scale combiner 504 may be omitted. When there is a case in which one of the road-surface-pattern scale calculator 511 and the dividing-line scale calculator 512 may be omitted, any one of them may be omitted.

The flowcharts illustrated in FIGS. 13 to 18 are merely examples, and some of the processes may be omitted or changed depending on the configuration or condition of the movement distance estimating device 301. For example, when the scale combiner 504 is omitted, the process in step 1405 in FIG. 14 may be omitted. When the road-surface-pattern scale calculator 511 is omitted, the processes in steps 1501 and 1502 in FIG. 15 may be omitted. When the dividing-line scale calculator 512 is omitted, the processes in steps 1504 and 1503 in FIG. 15 may be omitted.

The second-scale calculating unit 314 may also calculate a scale s by using the spatial-point global coordinates calculated by the space estimator 503. In such a case, the process in step 1802 in FIG. 18 may be omitted. When it is determined that the position of the reference spatial point determined in step 1804 in FIG. 18 is sufficiently close to the road surface 603, a scale s calculated based on the reference spatial point may be selected as the optimum scale s. In such a case, an image at a next time point may or may not be acquired in step 1801, and the process in step 1808 may also be omitted.

Figure 20:
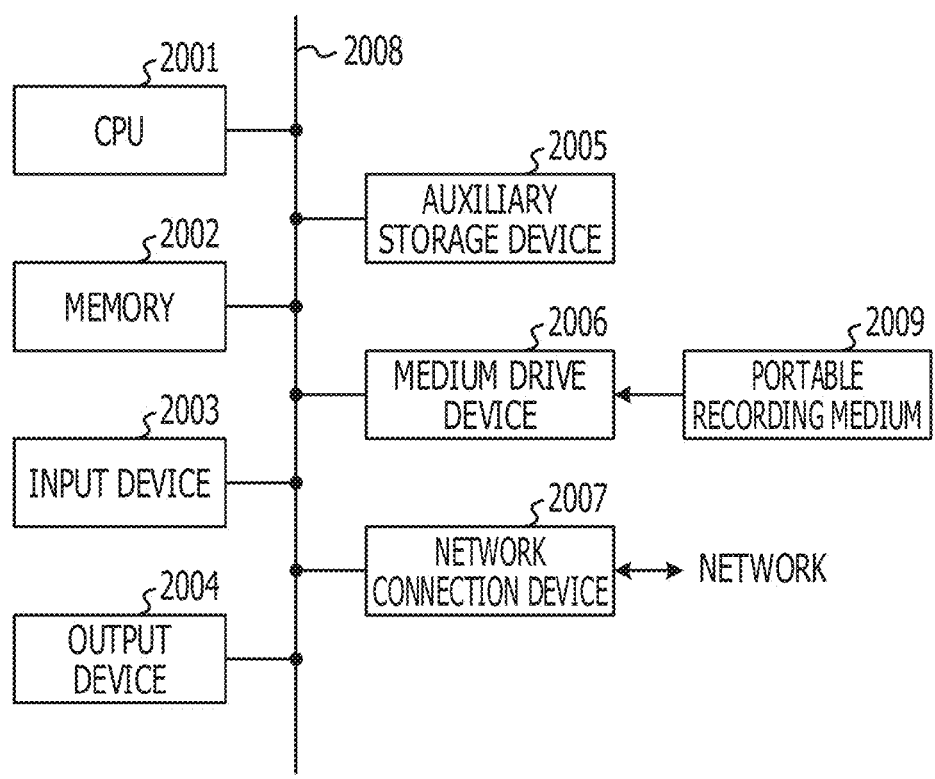
FIG. 20 is a block diagram of an information processing apparatus.

The movement distance estimating device 301 illustrated in FIGS. 3, 5, and 19 may be implemented by, for example, an information processing apparatus (a computer) as illustrated in FIG. 20.

The information processing apparatus illustrated in FIG. 20 includes a central processing unit (CPU) 2001, a memory 2002, an input device 2003, an output device 2004, an auxiliary storage device 2005, a medium drive device 2006, and a network connection device 2007. These constituent elements are coupled to each other through a bus 2008.

The memory 2002 is, for example, a semiconductor memory, such as a read only memory (ROM), a random access memory (RAM), or a flash memory and stores therein a program and data used for processing.

For example, by using the memory 2002, the CPU (processor) 2001 executes a program to operate as the relative-movement processing unit 312, the first-scale calculating unit 313, the second-scale calculating unit 314, and the movement distance calculating unit 315, to thereby perform the movement distance estimation processing. In this case, the CPU 2001 also operates as the feature-point detector 501, the motion estimator 502, the space estimator 503, the scale combiner 504, the road-surface-pattern scale calculator 511, and the dividing-line scale calculator 512.

The input device 2003 is implemented by, for example, a keyboard, a pointing device, and so on and is used to input an instruction or information from a user or operator. The output device 2004 is implemented by, for example, a display device, a printer, a speaker and so on and is used to output a query and a processing result to the user or operator. Examples of the processing result to be output include information indicating the movement distance D and the movement speed V.

Examples of the auxiliary storage device 2005 include a magnetic disk device, an optical disk device, a magneto-optical disk device, and a tape device. The auxiliary storage device 2005 includes a hard-disk drive. A program and data may be pre-stored in the auxiliary storage device 2005 so as to allow the information processing apparatus to use the program and data through loading into the memory 2002. The auxiliary storage device 2005 may also be used as the storage unit 311.

The medium drive device 2006 drives a portable recording medium 2009 and accesses the contents recorded therein/thereon. The portable recording medium 2009 is a memory device, a flexible disk, an optical disk, a magneto-optical disk, or the like. Examples of the portable recording medium 2009 include a compact disk read only memory (CD-ROM), a digital versatile disk (DVD), and a Universal Serial Bus (USB) memory. The user or operator may pre-store a program and data in/on the portable recording medium 2009 and may use the program and data through loading into the memory 2002.

As described above, computer-readable recording media that store the program and data used for the movement distance estimation processing include physical (non-transitory)

recording media, such as the memory 2002, the auxiliary storage device 2005, and the portable recording medium 2009.

The network connection device 2007 is a communication interface that is connected to a communications network, such as a local area network (LAN) or the Internet, to perform data conversion involved in communication. The network connection device 2007 may also be used as the reception unit 1911.

The information processing apparatus may receive a processing request from a user terminal through the network connection device 2007 and may transmit information indicating the movement distance D and the movement speed V, which are processing results, to the user terminal. The information processing apparatus may receive a program and data from an external apparatus via the network connection device 2007 and may use the program and data through loading into the memory 2002.

The information processing apparatus may or may not include all of the constituent elements illustrated in FIG. 20, and one or some of the constituent elements may also be omitted depending on the application or the condition. For example, when the information processing apparatus receives a processing request from the user terminal through the communications network, the input device 2003 and the output device 2004 may be omitted.

While the disclosed embodiment and advantages thereof have been described above in detail, it is apparent to those skilled in the art that various changes, additions, and omissions can be made thereto without departing from the scope of the present disclosure clearly recited in the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A movement distance estimating device comprising:
   a memory; and
   a processor coupled to the memory and configured to:
     determine, based on a first image and a second image included in a plurality of images among images captured by an image capture device mounted on a moving body, an amount of relative movement of the moving body between a first time point at which the first image is captured and a second time point at which the second image is captured,
     determine a plurality of scales for the amount of relative movement using the plurality of images, each of the plurality of scales being determined based on a relation in a three-dimensional space between a road surface and a spatial point corresponding to a feature point in an area other than a road-surface area in each of the plurality of images,
     select a smallest scale among the plurality of scales, and determine a movement distance of the moving body between the first time point and the second time point, based on the amount of relative movement and the smallest scale.

2. The movement distance estimating device according to claim 1,
   wherein the processor is configured to determine the plurality of scales, based on a condition that the spatial point exists on the road surface in the three-dimensional space.

3. The movement distance estimating device according to claim 1,
   wherein the processor is configured to determine the plurality of scales, based on a condition that the spatial point that is included in spatial points corresponding to feature points in the area other than the road-surface area and that is within a given distance from the road surface exists on the road surface.

4. The movement distance estimating device according to claim 1, wherein the processor is configured to:
   determine another scale for the amount of relative movement, based on a partial image in the road-surface area in at least one of the captured images,
   determine the plurality of scales, when the another scale is not determined based on the partial image, and
   determine the movement distance, based on the amount of relative movement and one of the smallest scale and the another scale.

5. The movement distance estimating device according to claim 4, wherein the processor is configured to:
   detect a first lane-dividing line from one of the captured images,
   detect a second lane-dividing line from one of the captured images, and
   determine the another scale, based on a difference between a first difference and a second difference, the first difference being a difference between the moving body and the first lane-dividing line, and the second difference being a difference between the moving body and the second lane-dividing line.

6. The movement distance estimating device according to claim 1,
   wherein the processor is configured to determine a movement speed of the moving body, based on the movement distance and a movement time from the first time point to the second time point.

7. The movement distance estimating device according to claim 1, further comprising:
   a storage configured to store therein the captured images, wherein the processor is configured to refer to the storage.

8. A movement distance estimating method comprising:
   determining, based on a first image and a second image included in a plurality of images among images captured by an image capture device mounted on a moving body, an amount of relative movement of the moving body between a first time point at which the first image is captured and a second time point at which the second image is captured;
   determining a plurality of scales for the amount of relative movement using the plurality of images, each of the plurality of scales being determined based on a relation in a three-dimensional space between a road surface and a spatial point corresponding to a feature point in an area other than a road-surface area in each of the plurality of images;
   selecting a smallest scale among the plurality of scales; and
   determining, by a processor, a movement distance of the moving body between the first time point and the second time point, based on the amount of relative movement and the smallest scale.

9. The movement distance estimating method according to claim 8, wherein the determining the plurality of scales includes determining the plurality of scales based on a condition that the spatial point exists on the road surface in the three-dimensional space.

10. The movement distance estimating method according to claim 8, wherein the determining the plurality of scales includes determining the plurality of scales based on a condition that the spatial point that is included in spatial points corresponding to feature points in the area other than the road-surface area and that is within a given distance from the road surface exists on the road surface.

11. The movement distance estimating method according to claim 8, further comprising:
    determining another scale for the amount of relative movement, based on a partial image in the road-surface area in at least one of the captured images;
    determining the plurality of scales, when the another scale is not determined based on the partial image; and
    determining the movement distance, based on the amount of relative movement and one of the smallest scale and the another scale.

12. The movement distance estimating method according to claim 11, further comprising:
    detecting a first lane-dividing line from one of the captured images;
    detecting a second lane-dividing line from one of the captured images; and
    determining the another scale, based on a difference between a first difference and a second difference, the first difference being a difference between the moving body and the first lane-dividing line, and the second difference being a difference between the moving body and the second lane-dividing line.

13. The movement distance estimating method according to claim 8, further comprising:
    determining a movement speed of the moving body, based on the movement distance and a movement time from the first time point to the second time point.

14. The movement distance estimating method according to claim 8, further comprising:
    referring to a storage configured to store therein the captured images.

15. A non-transitory computer-readable recording medium storing a program that causes a computer to execute a procedure, the procedure comprising:
    determining, based on a first image and a second image included in a plurality of images among images captured by an image capture device mounted on a moving body, an amount of relative movement of the moving body between a first time point at which the first image is captured and a second time point at which the second image is captured;
    determining a plurality of scales for the amount of relative movement using the plurality of images, each of the plurality of scales being determined based on a relation in a three-dimensional space between a road surface and a spatial point corresponding to a feature point in an area other than a road-surface area in each of the plurality of images;
    selecting a smallest scale among the plurality of scales; and
    determining a movement distance of the moving body between the first time point and the second time point, based on the amount of relative movement and the smallest scale.

* * * * *